(12) United States Patent
Chou

(10) Patent No.: US 8,220,813 B2
(45) Date of Patent: Jul. 17, 2012

(54) PEDAL-DRIVEN SCOOTER

(76) Inventor: Shui-Chuan Chou, Taipei (TW)

( * ) Notice: Subject to any disclaimer, the term of this patent is extended or adjusted under 35 U.S.C. 154(b) by 78 days.

(21) Appl. No.: 12/929,178

(22) Filed: Jan. 6, 2011

(65) Prior Publication Data

US 2011/0193311 A1 Aug. 11, 2011

(30) Foreign Application Priority Data

Feb. 3, 2010 (TW) .............................. 99202188 U

(51) Int. Cl.
*B62M 1/00* (2010.01)
(52) U.S. Cl. ........ 280/221; 280/220; 280/256; 280/253; 280/257
(58) Field of Classification Search .................. 280/221, 280/220, 256, 253, 257
See application file for complete search history.

(56) References Cited

U.S. PATENT DOCUMENTS

| | | | | |
|---|---|---|---|---|
| 6,588,784 B1 * | 7/2003 | Chen | ............................. | 280/221 |
| 6,698,779 B2 * | 3/2004 | Jeng | ............................. | 280/210 |
| 7,487,987 B2 * | 2/2009 | Yan | ............................. | 280/221 |
| 7,621,547 B1 * | 11/2009 | Fan | ............................. | 280/221 |
| 7,784,808 B2 * | 8/2010 | Fan | ............................. | 280/221 |
| 7,988,169 B2 * | 8/2011 | Baek et al. | ................... | 280/221 |
| 2012/0013097 A1 * | 1/2012 | Fan | ............................. | 280/221 |

* cited by examiner

*Primary Examiner* — Paul N Dickson
*Assistant Examiner* — Marlon Arce

(57) ABSTRACT

A pedal-driven scooter includes a frame, a head tube, a driving mechanism and two pedals. The pedals can move alternatingly to power the driving mechanism and making the rear wheels to roll. Therefore, a user can standing on the pedals to operate the scooter without kicking the floor as the conventional scooter.

7 Claims, 5 Drawing Sheets

PEDAL-DRIVEN SCOOTER

FIELD OF THE INVENTION

The present invention relates to a human-powered scooter, more specifically, the motion is provided by stepping the pedals of the scooter.

DESCRIPTION OF PRIOR ART

The conventional scooter, also referred as kick scooter, usually has a plate-like frame, with a rear wheel set on the rear end thereof. A head tube, whose both ends connect to a handle and a frontal wheel, is set in the front of the frame for steering. When riding, the user is standing on the frame, using one foot to kick the ground and pushing the scooter to move forward.

Like skateboard or bicycle, riding the kick scooter may be difficult for the beginner to maintain the balance of the body, which may cause the scooter to incline, making the user to fall. Therefore, to provide a scooter that is easier to learn and can avoid the accident or danger has become the main objective of the present invention.

SUMMARY OF THE INVENTION

To achieve above-mentioned objective, a pedal-driven scooter consists of: a planar frame having two elongated slits, each disposed on a side of the frame, two first supporting posts are provided at a rear end of the frame and two second supporting posts are provided approximate said first supporting posts. The first supporting posts pin jointed a horizontal first axle for supporting a first gear, set in a center thereof, and two rear wheels.

A head tube, attached to a frontal portion of the frame and a frontal wheel is provided at a bottom end thereof.

A handle provided securely on a top of the head tube.

A driving mechanism, including a second gear, a second axel and two driving units, and said second gear is set in a center of the second axel. The second supporting posts pin jointed the second axel. The first and second gears are engaging directly or indirectly. An end of each driving units is attached securely to an end of the second axel respectively, and an another end is passing through the slit and extending upwardly.

Two pedals are set on a top of the frame and a bottom thereof is attached to the driving unit. By sliding the pedals alternatingly, the driving units drive the second gear and the first gear, allowing the first axel to rotate, moving the rear wheels.

Conclusively, the claimed pedal-driven scooter allows the user to operate with better equilibrium to reduce accident as mentioned previously.

DETAIL DESCRIPTION OF PREFERRED EMBODIMENTS

The preferred embodiments of the present invention are described in detail hereinafter, according to the appended drawings.

Figure 1:
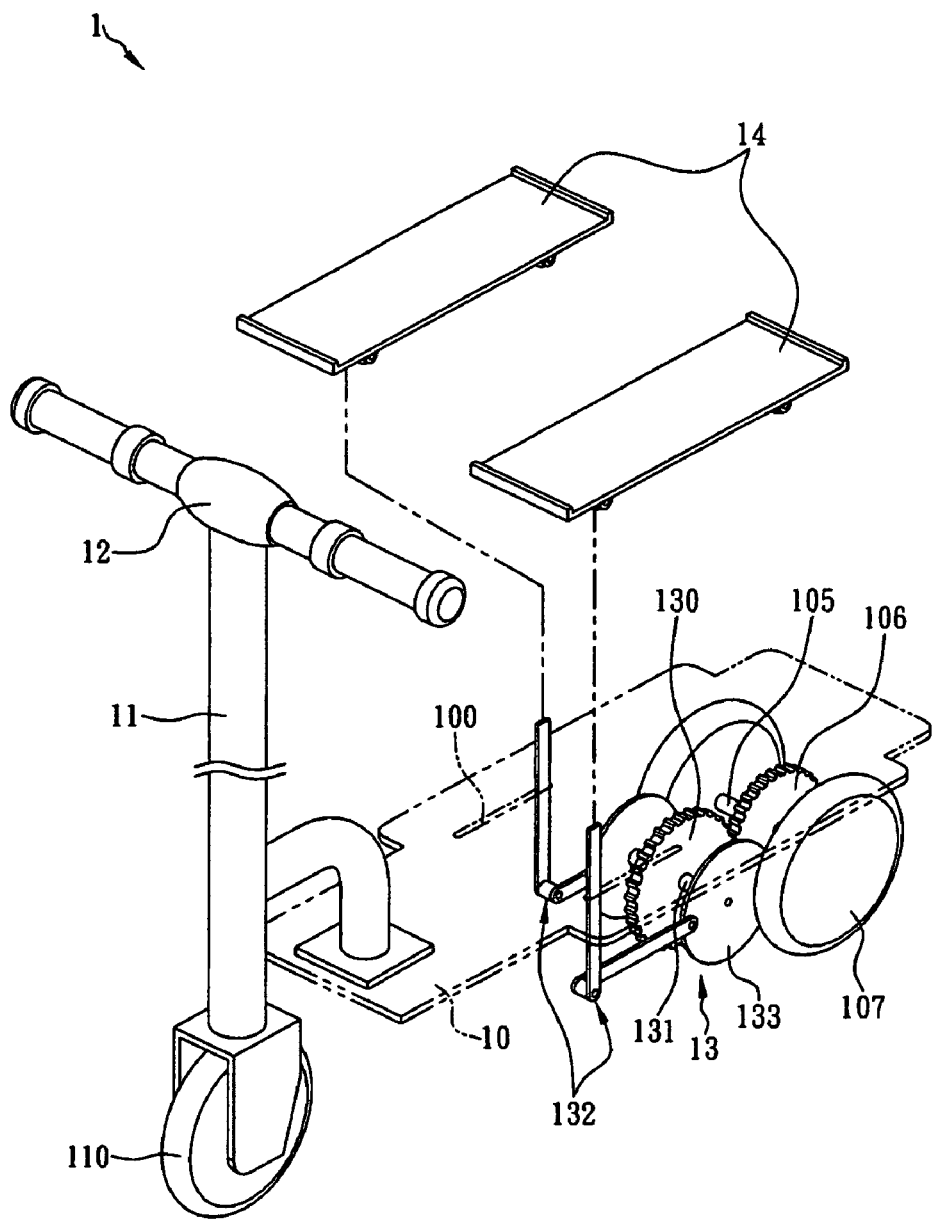
FIG. 1 is a perspective view of the first embodiment of a pedal-driven scooter.
Figure 2:
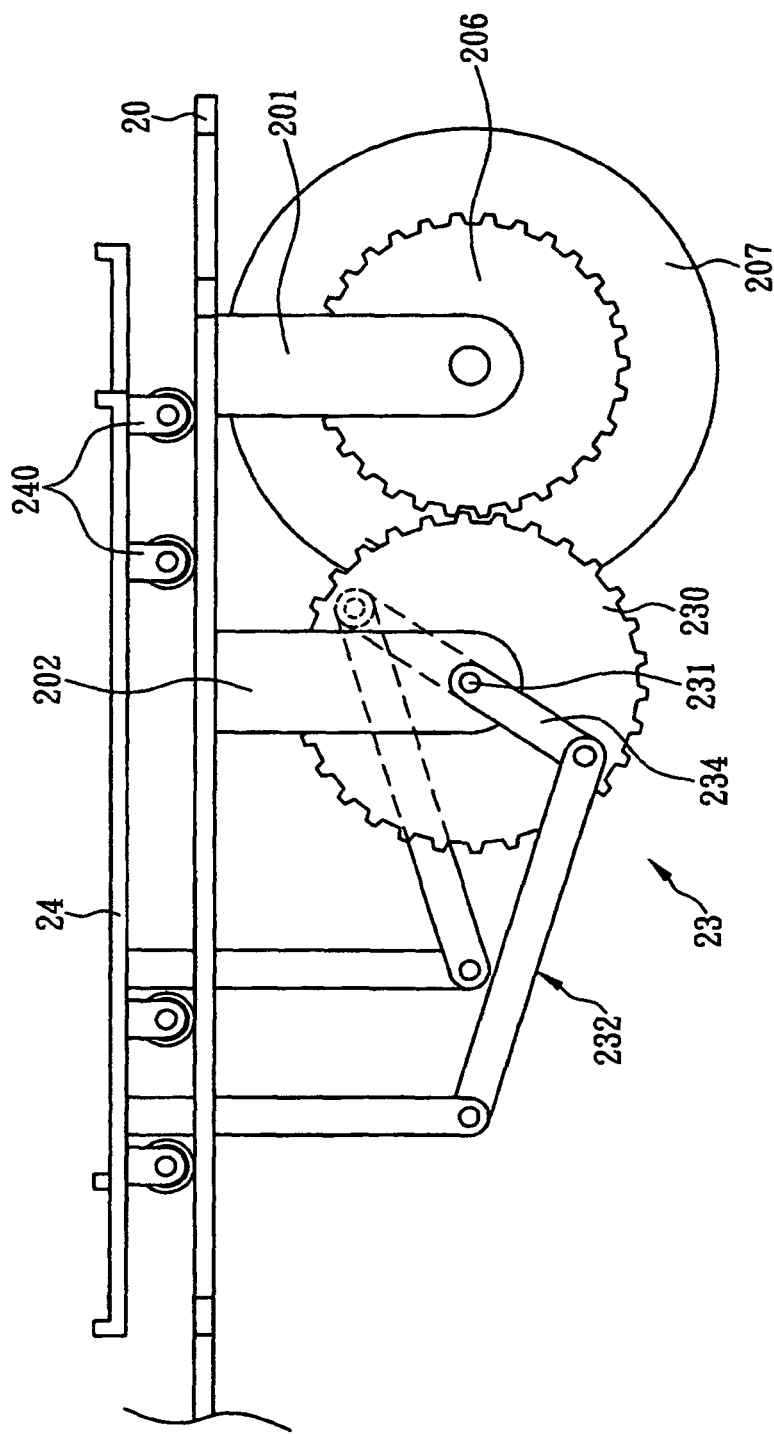
FIG. 2 is a schematic view illustrating the drivetrain of the second embodiment of the scooter.

Referring to FIGS. 1 and 2, the first embodiment showing a pedal-driven scooter consists of a planar frame (10), a head tube (11), a handle (12), a driving mechanism (13) and two pedals (14). The frame (10) having two elongated slits (100), each disposed on a side of the frame (10), two first supporting posts (201) are provided at a rear end of the frame (10) and two second supporting posts (202) are provided approximate said first supporting posts (201). The first supporting posts (201) pin jointed a horizontal first axle (105) for supporting a first gear (106), set in a center thereof, and two rear wheels (107).

The head tube (11), where the lower portion thereof is attached to a frontal portion of the frame (10) and a frontal wheel (110) is attached to the bottom end of the head tube (11).

The handle (12) is mounted securely on a top of the head tube (11).

The driving mechanism (13), including a second gear (130), a second axel (131) and two driving units (132), and said second gear (130) is set in a center of the second axel (131). The second supporting posts (202) and the second axel (131) are pin jointed. The first and second gears (106, 130) are engaging directly or indirectly. An end of each driving units (132) is attached securely to an end of the second axel (131) respectively, and another end thereof is passing through the slit (100) and extending upwardly.

The two pedals (14) are set freely on top of the frame (10), approximately above the slits (100). Each bottom face of the pedal (14) is attached to the driving unit (132). Therefore, by sliding the pedals (14) alternatingly, the driving units (132) can drive the second gear (130), the first gear (106) and allow the first axel (105) to rotate, moving the rear wheels (107).

Since the user's feet will be used to operate the pedal (14), driving the rear wheels (107) through the mechanism (13) when riding the scooter (1), the balance is easier to be maintained than the conventional kick scooter, which can reduce the difficulty of the usage and improve the safety.

A disc (133) is coupled to both ends of the second axel (131) respectively, and an end of the driving unit (132) is coupled to the edge of the disc (133). The driving unit (132) can be attached to the second axel (131) either directly or indirectly for driving the rear wheel (107). Further, the shape of the disc (133) is not limited to be circular, and it can be altered by the manufacture according to the actual requirement. As shown in FIG. 2, the second embodiment illustrates a possible variation of the disc (133) by replacing it with an arm (234). A driving unit (232) pivotally coupled the arm (234), whose one end couples pivotally to a second axel (231) to drive the rear wheel (107).

Figure 3:
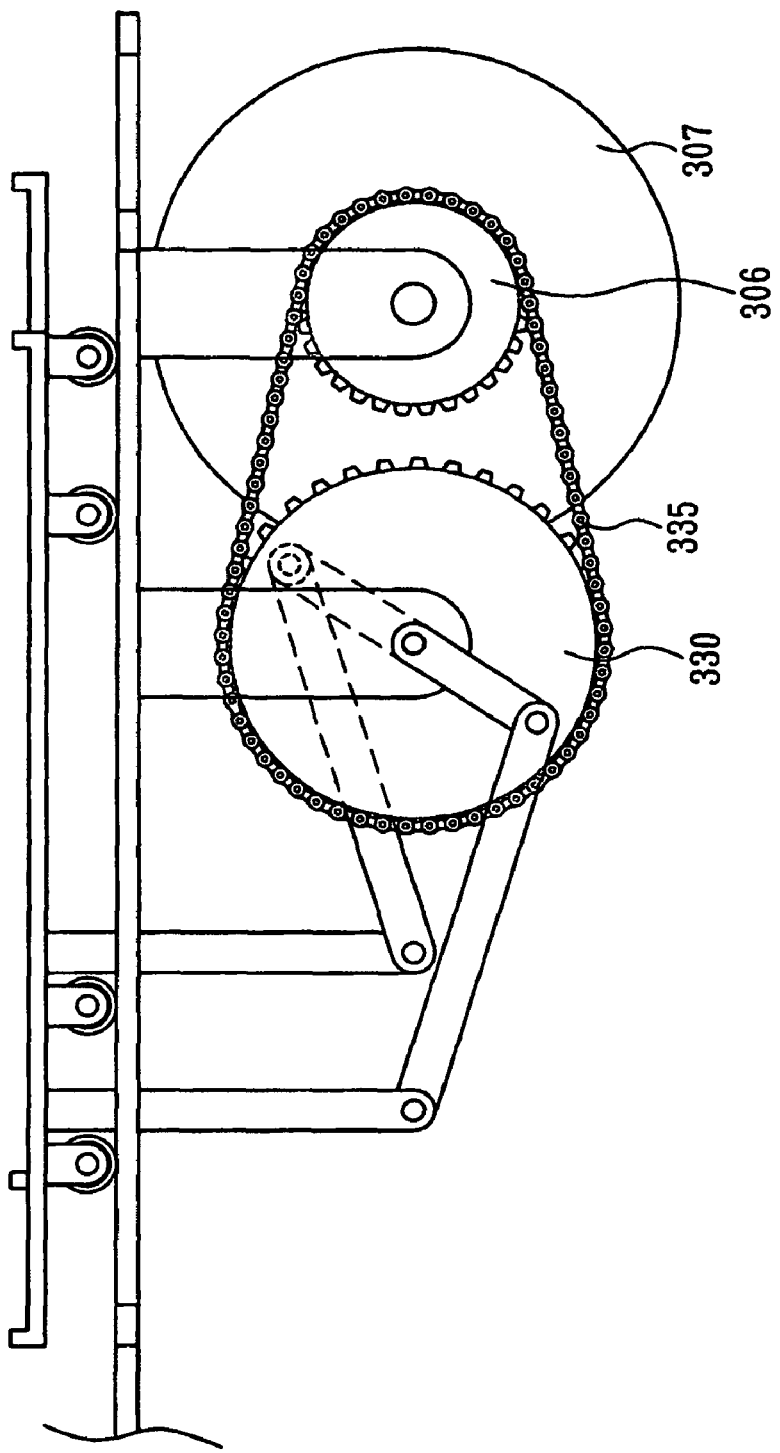
FIG. 3 is a schematic view illustrating the drivetrain of the third embodiment of the scooter.

The first and second gears (206, 230) of the second embodiment are engaged directly, the configuration can also be set to have them engaged indirectly. Referring to FIG. 3, the third embodiment of the invention, showing the first gear (306) can be driven by the second gear (330) through a gear chain (335) to drive the rear wheel (307).

Figure 4:
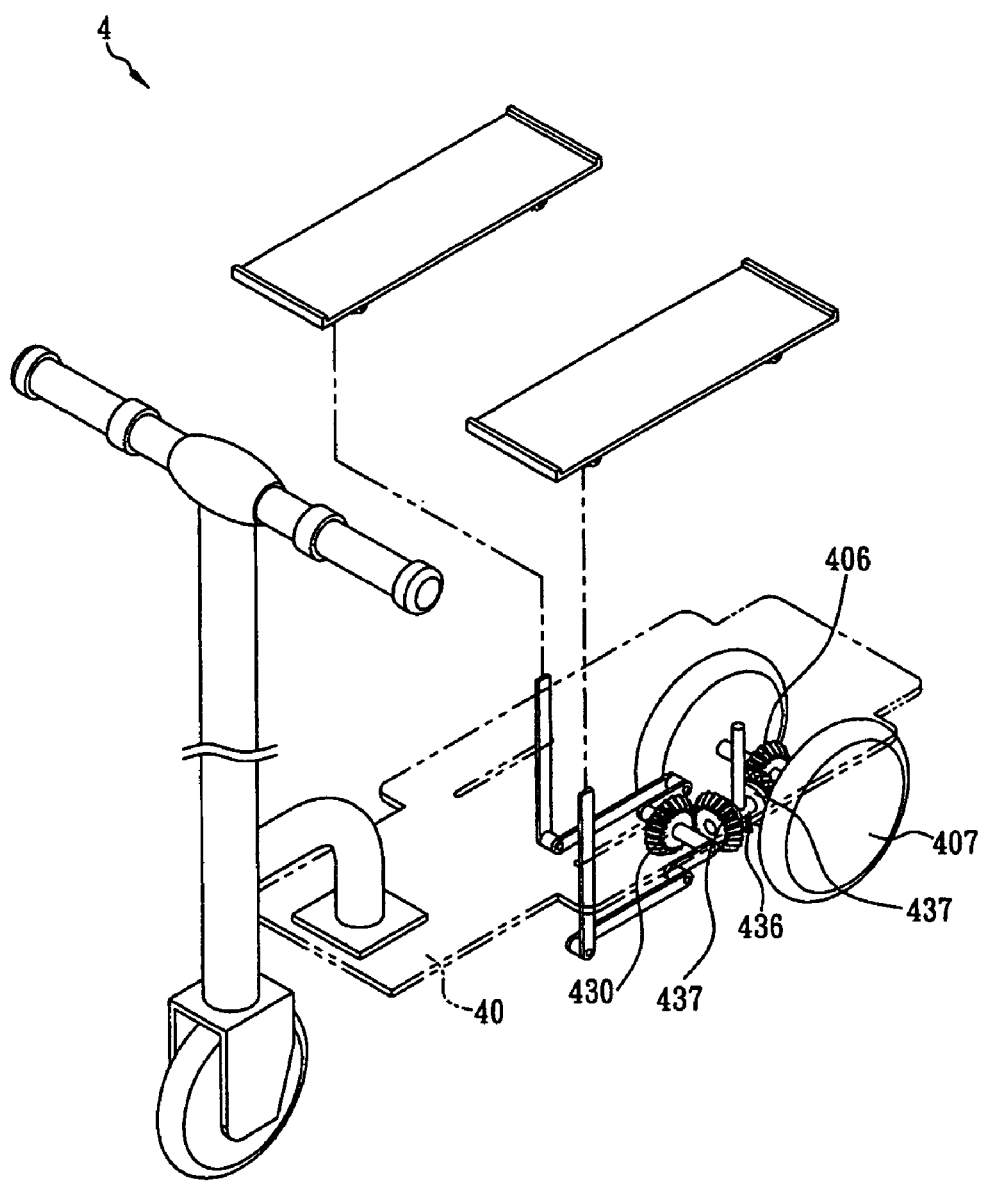
FIG. 4 is a perspective view of the forth embodiment of the scooter.

As illustrating in FIG. 4, the forth embodiment has a first and second gears (406, 430) as two conical gears, corresponding another two conical gears (437), which coupled by a shaft (436), pin jointed at the bottom of the frame (40). By providing the shaft (436) in between, the first and second gears (406, 430) can engage with the conical gear (437) on each end thereof, and drive the rear wheel (407) to move the scooter (4).

Further, as shown in FIG. 2, each pedal (24) includes a plurality of wheels (240) provided on the bottom thereof for allowing the pedal (24) rolling on the frame (20)

Figure 5:
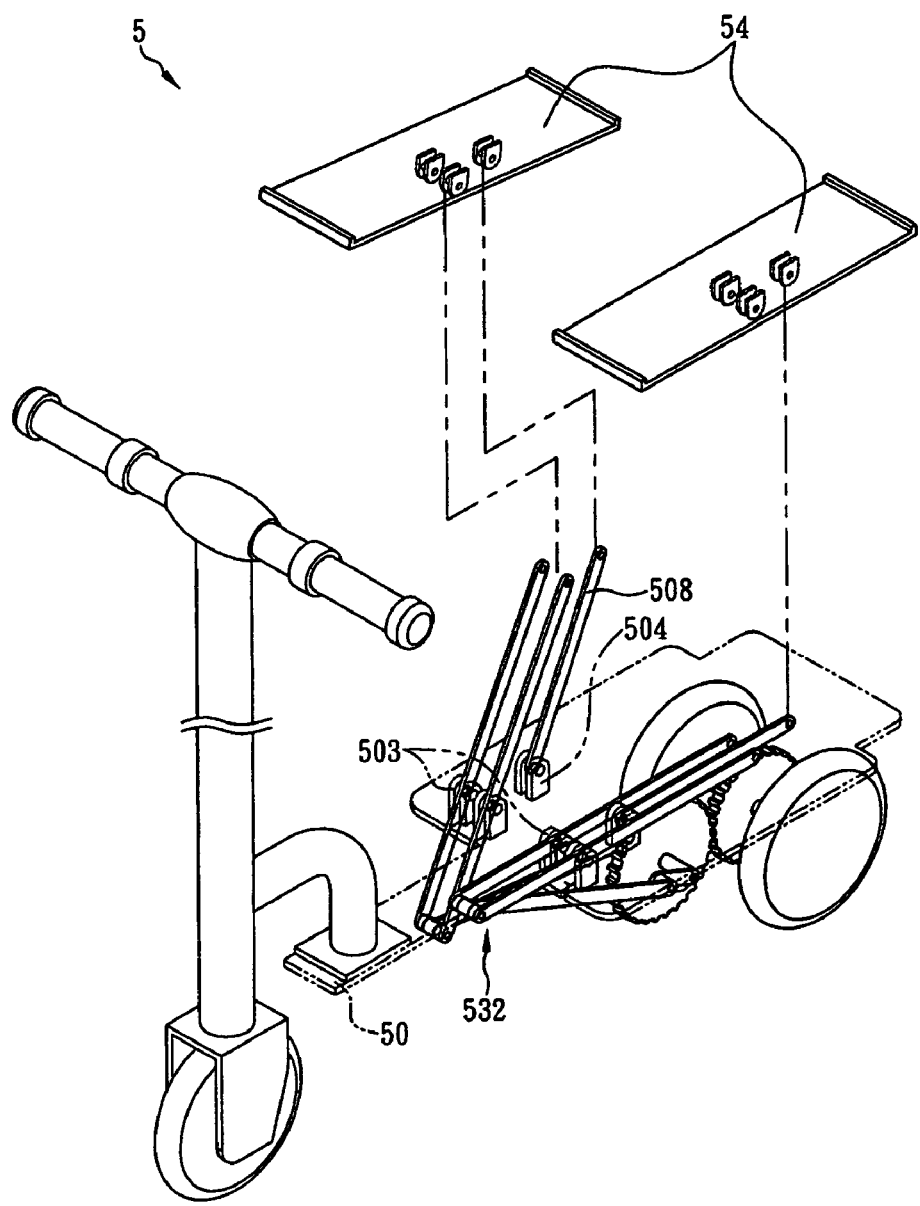
FIG. 5 is a perspective view of the fifth embodiment of the scooter.

The pedal (14) is not limited to move horizontally for moving the scoter (1). The fifth embodiment, as shown in FIG. 5, has two third supporting posts (503) provided at frontal portion of an upper surface of the frame (50), and two forth supporting posts (504) are provided approximate said third supporting posts (503). Each forth supporting post (504) can couple pivotally to an end of an elongated arm (508), and an end of each driving units (532) is attached securely to the bottom face of the pedal (54) respectively, while another end thereof is extending upwardly and pin jointed the third supporting post (503).

Two pedals (54) are set on a top of the frame (50) and the bottom of the pedal (54) is attached to the driving unit (532). An end of the arm (508) is also attached to the bottom of the pedal (54). Therefore, the user is also allow to step the pedals (54) alternatingly like the stepping machine, the driving units (532) drive the second gear, the first gear and allow the first axel to rotate, moving the rear wheels

The invention claimed is:

1. A pedal-driven scooter comprising:
   a planar frame having two elongated slits, each disposed on a side of the frame, two first supporting posts are provided at a rear end of the frame and two second supporting posts are provided approximate said first supporting posts; the first supporting posts coupled pivotally a horizontal first axle for supporting a first gear, set in a center thereof, and two rear wheels;
   a head tube, attached to a frontal portion of the frame and a frontal wheel is provided at a bottom end thereof;
   a handle provided securely on a top of the head tube;
   a driving mechanism, consisting of a second gear, a second axel and two driving units; said second gear is set in a center of the second axel; the second supporting posts pin jointed the second axel; the first and second gears are engaging directly or indirectly; an end of each driving units is attached securely to an end of the second axel respectively, and an another end is passing through the slit and extending upwardly; and
   two pedals, set on a top of the frame and a bottom attached to the driving unit; therefore, by sliding the pedals alternatingly, the driving units drive the second gear, the first gear and allow the first axel to rotate, moving the rear wheels.

2. The pedal-driven scooter of claim 1, wherein said first gear is driven by the second gear through a gear chain.

3. The pedal-driven scooter of claim 1, wherein said first and second gears are two conical gears, corresponding another two conical gears, which coupled by a shaft, pin jointed at the bottom of the frame.

4. The pedal-driven scooter of claim 1, 2 or 3, wherein each pedal includes a plurality of wheels for allowing the pedal sliding on the frame.

5. A pedal-driven scooter comprising:
   a planar frame, two first supporting posts are provided at a rear end of the frame, two second supporting posts are provided approximate said first supporting posts; two third supporting posts are provided at frontal portion of an upper surface of the frame, and two forth supporting posts are provided approximate said third supporting posts; each forth supporting posts pivotally coupled to an end of an elongated arm, and the first supporting posts pin jointed a horizontal first axle for supporting a first gear, set in a center thereof, and two rear wheels;
   a head tube, attached to a frontal portion of the frame and a frontal wheel is coupled to a bottom end thereof;
   a handle, provided securely on a top of the head tube;
   a driving mechanism, consisting of a second gear, a second axel and two driving units; said second gear is set in a center of the second axel, and the second axel join pivotally to a bottom of the second supporting posts; the first and second gears are engaging directly or indirectly; an end of each driving unit is attached securely to an end of the second axel respectively, and another end is extending upwardly and pin jointed with the third supporting post; and
   two pedals, set on a top of the frame and a bottom attached to the driving unit; therefore, by sliding the pedals alternatingly, the driving units drive the second gear, the first gear and allow the first axel to rotate, moving the rear wheels.

6. The pedal-driven scooter of claim 5, wherein said first gear (306) is driven by the second gear through a gear chain.

7. The pedal-driven scooter of claim 5, wherein said first and second gears are two conical gears, corresponding another two conical gears, which coupled by a shaft, pin jointed at the bottom of the frame.

* * * * *